(12) United States Patent
Kang et al.

(10) Patent No.: US 7,502,009 B2
(45) Date of Patent: Mar. 10, 2009

(54) METHOD AND APPARATUS FOR CONTROLLING OPERATION OF LAMPS

(75) Inventors: Seock-Hwan Kang, Suwon-si (KR);
Hyeong-Suk Yoo, Yongin-si (KR);
Gi-Chang Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 861 days.

(21) Appl. No.: 10/916,691

(22) Filed: Aug. 11, 2004

(65) Prior Publication Data
US 2005/0078080 A1    Apr. 14, 2005

(30) Foreign Application Priority Data
Aug. 11, 2003   (KR) .................. 10-2003-0055310

(51) Int. Cl.
*G09G 3/36* (2006.01)
(52) U.S. Cl. .................. 345/102; 345/84
(58) Field of Classification Search .......... 345/72, 345/84, 87, 101, 102; 313/115, 567, 568, 313/569; 315/157
See application file for complete search history.

(56) References Cited

U.S. PATENT DOCUMENTS

| | | | |
|---|---|---|---|
| 4,922,241 A * | 5/1990 | Inoue et al. .................. 345/98 |
| 6,388,388 B1 * | 5/2002 | Weindorf et al. .......... 315/169.3 |
| 6,424,100 B1 | 7/2002 | Kominami et al. | |
| 6,710,762 B1 * | 3/2004 | Hasegawa .................... 345/101 |
| 6,843,584 B2 * | 1/2005 | Bang et al. .................. 362/249 |
| 7,221,345 B2 * | 5/2007 | Lee et al. ........................ 345/87 |
| 7,242,384 B2 * | 7/2007 | Yamamoto et al. .......... 345/102 |
| 2002/0003525 A1 * | 1/2002 | Hwang ........................ 345/102 |
| 2003/0214478 A1 * | 11/2003 | Yoo et al. .................... 345/102 |
| 2004/0135484 A1 * | 7/2004 | Lim ............................ 313/234 |

FOREIGN PATENT DOCUMENTS

| CN | 2256617 | 6/1997 |
|---|---|---|
| KR | 2003089299 | * 11/2003 |

OTHER PUBLICATIONS

Office Action from Chinese Patent Office corresponding to Korean Patent Application No. 2003-55310 and English translation.

* cited by examiner

*Primary Examiner*—Chanh Nguyen
*Assistant Examiner*—Pegeman Karimi
(74) *Attorney, Agent, or Firm*—Cantor Colburn LLP

(57) ABSTRACT

A device for controlling operation of lamps is provided. The device includes a power outputting part to provide a power voltage to a lamp array having at least one lamp; a temperature sensing part to detect a temperature of the lamp and to generate a temperature signal; and a controlling part to compare the temperature of the lamp with a threshold temperature to generate a first switching signal, in response to the temperature signal, and to output the first switching signal to the power outputting part to feedback control the temperature of the lamp.

56 Claims, 9 Drawing Sheets

METHOD AND APPARATUS FOR CONTROLLING OPERATION OF LAMPS

BACKGROUND OF THE INVENTION

1. Field of the Invention

The present invention relates to a method and apparatus for controlling operation of lamps, and a backlight assembly and liquid crystal display device having the same. More particularly, the present invention relates to a method and apparatus for controlling operation of lamps in which temperatures of the external electrodes of the lamps are detected and controlled to be lower than a threshold temperature on which pinholes are generated.

2. Description of the Related Art

Liquid crystal display (LCD) devices include a liquid crystal (LC) panel to display images and a backlight assembly disposed on a rear portion of the LC panel to supply light to the LC panel. Backlight assemblies are classified into an edge type and a direct type according to the position of a light source.

Edge type backlight assemblies have light sources disposed at an edge portion of an LC panel, and are used in smaller sized LCD devices such as laptops or desktop computers. Edge type backlight assemblies have superior light uniformity and endurance life and allow LCD devices to be slimmer. Direct type backlight assemblies have a plurality of lamps arranged in parallel under a diffusing plate, and supply light to the entire surface of LC panel. Direct type backlight assembles have superior luminance, and are used in larger LCD devices. External electrode fluorescent lamps (EEFLs), which have improved light efficiency and reduced manufacturing cost as compared with cold cathode fluorescent lamps (CCFLs), are used for direct type backlight assemblies.

FIG. 1 is a schematic view illustrating a method for controlling the operation of an EEFL employed in a backlight assembly. A sensor 10 and a control circuit 14 determine together whether the EEFL 12 is turned on/off, and control the operation of an inverter 16. For example, when the sensor 10 and the control circuit 14 determine that the EEFL 12 is turned off, a shutdown signal is applied to the inverter 16, thereby forcibly shutting down an electrical power provided to the EEFL 12.

The shutdown method, however, shutdowns a backlight assembly after the EEFL 12 is turned off. That is because pinholes are generated in the EEFL 12. Further, when a plurality of EEFLs is disposed to be closer to each other or the sensor 10 is disposed farther away from the EEFL 12, it is not easy to determine whether an individual EEFL 12 is turned off or not. Furthermore, because there are other factors that could affect the determination such as a condition of lamp, a distance between the lamp and the sensor, a structure of a metal device, etc, the shutdown method is not reliable.

SUMMARY OF THE INVENTION

The present invention provides a device and method to control the operation of lamps connected to each other in parallel, in which the temperature of the lamps is controlled lower than a threshold temperature on which pinholes are generated at the external electrodes of the lamps.

The present invention further provides a backlight assembly including the device to control the operation of lamps.

The present invention still further provides a liquid crystal display device including the device to control the operation of lamps of a backlight assembly.

According to one aspect of the invention, a device for controlling operation of lamps comprises a power outputting part to provide a power voltage to a lamp array having at least one lamp; a temperature sensing part to detect a temperature of the lamp and to generate a temperature signal; and a controlling part to compare the temperature of the lamp with a threshold temperature to generate a first switching signal, in response to the temperature signal, and to output the first switching signal to the power outputting part to feedback control the temperature of the lamp.

According to another aspect of the invention, a backlight assembly comprises a lamp array to generate a first light, the lamp array including at least one lamp; a device to control operation of the lamp, the device including: a power outputting part to provide the lamp with a power voltage; a temperature sensing part to detect a temperature of the lamp and to generate a temperature signal; and a controlling part to compare the temperature of the lamp with a threshold temperature to generate a first switching signal, in response to the temperature signal, and to output the first switching signal to the power outputting part to feedback control the temperature of the lamp.

According to further aspect of the invention, a liquid crystal display device comprises a backlight assembly including a lamp array, having at least one lamp, to generate light; and a liquid crystal panel, disposed on the backlight assembly, to display an image in response to the light output from the backlight assembly, wherein the backlight assembly further includes a device to control operation of the lamp, the device includes: a power outputting part to provide the lamp with a power voltage; a temperature sensing part to detect a temperature of the lamp and to generate a temperature signal; and a controlling part to compare the temperature of the lamp with a threshold temperature to generate a first switching signal, in response to the temperature signal, and to output the switching signal to the power outputting part to feedback control the temperature of the lamp.

According to still further aspect of the invention, a method for controlling operation of lamps comprises supplying a power voltage to a lamp array having at least one lamp; detecting a temperature of the lamp to generate a temperature signal; generating a first switching signal by comparing the temperature of the lamp with a threshold temperature; and feedback controlling the temperature of the lamp in response to the first switching signal.

BRIEF DESCRIPTION OF THE DRAWINGS

The above and other features and advantage points of the present invention will become more apparent by describing in detailed exemplary embodiments thereof with reference to the accompanying drawings, in which.

DETAILED DESCRIPTION OF THE INVENTION

Hereinafter exemplary embodiments of the present invention will be described in detail with reference to the accompanied drawings.

Figure 1:
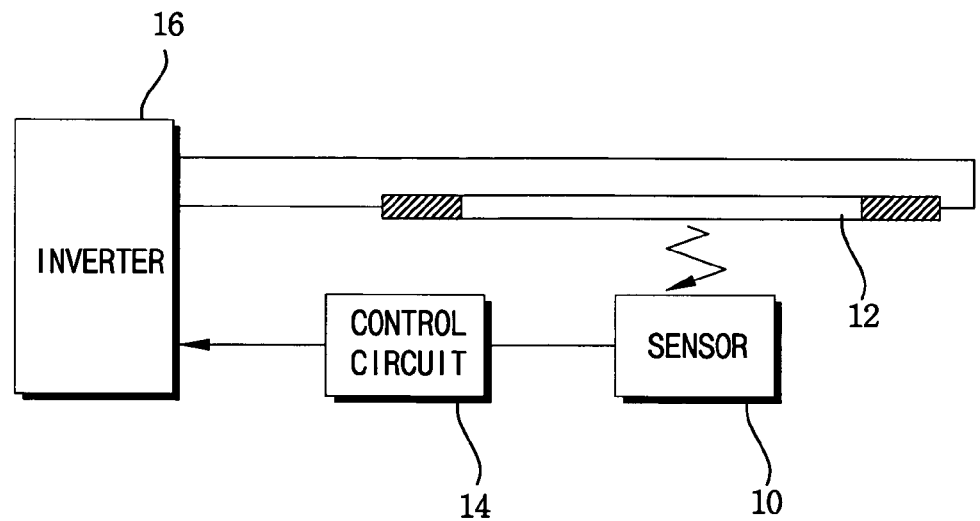
FIG. 1 is a schematic view illustrating a shutdown method for controlling the operation of an EEFL employed in a backlight assembly.
Figure 2:
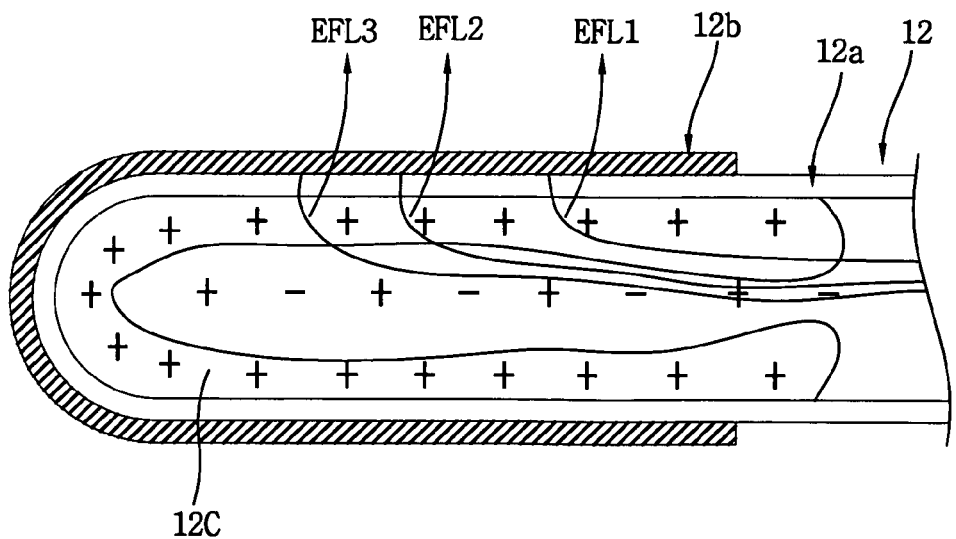
FIG. 2 is a diagram illustrating a plasma distribution on an external electrode of an EEFL employed in a backlight assembly.

FIG. 2 is a view illustrating a plasma distribution on an external electrode of EEFL in which first to third electric field lines EFL1 to EFL3 are indicated. The EEFL 12 includes a glass 12a and an external electrode 12b surrounding the glass 12a. When a voltage higher than a threshold voltage of a capacitor is applied to the external electrode 12b of the EEFL 12, an electric filed is intensively created at a narrow portion of a plasma sheath area 12c according to the plasma sheath's distribution. A temperature is remarkably increased at the narrow sheath area. When the temperature at the narrow sheath area reaches the threshold temperature ($T_g$) of the glass 12a, for example 500° C., pinholes are generated due to the pressure difference between inside and outside of the lamp 12. The higher the temperature is, the lower the electrical resistance of the glass is. Thus, a higher electrical charge at the lower resistance rapidly spreads out the pinholes into the entire external electrode 12b to thereby break down insulation.

For example, because the first electric field line EFL1 has a narrow sheath area, pinholes, for example, more than 80% of all generated pinholes, are intensively generated along the first electric filed line EFL1, thereby breaking down the insulation of the glass 12a. An experimental result at a room temperature shows that the pinholes are less generated when a driving voltage is lower than an insulation breakdown voltage, for example, 7 kV/mm. At that time, a tube voltage is 2400V at a glass thickness of 0.3 mm, and is less than or equal to 3500V at a glass thickness of 0.5 mm. The higher the temperature is, the lower the insulation breakdown voltage of the glass is. Thus, pinholes are prevented from generating by reducing the temperature of the external electrode 12b as much as possible or by applying the driving voltage at a temperature less than or equal to the threshold temperature (Tg) of the glass 12a. Thus, the temperature at which pinhole are generated depends on the thickness of the glass 12a and the length of the external electrode 12b (or a capacitor).

Table 1 shows the threshold voltage and temperature at which the pinhole is generated with respect to a lamp size, a temperature, a voltage and a capacitance.

TABLE 1

| EEFL (diameter/length/thickness) | 2.6 mm/ 15 mm/ 0.3 mm | 3.0 mm/ 5 mm/ 0.3 mm | 3.0 mm/ 15 mm/ 0.5 mm |
|---|---|---|---|
| Capacitance of external electrode [pF] | 17 | 20 | 11 |
| Threshold voltage [Vrms] | 2516 V (8.5 mA) | 2480 V (9.7 mA) | 3520 V (6.5 mA) |
| Threshold temperature [° C.] | 210 | 240 | 130 |

As shown in TABLE 1, when the EEFL 12 has a diameter of 2.6 mm, the external electrode 12b having a length of 15 mm and the glass 12a having a thickness of 0.3 mm, pinholes are generated at an electrode capacitance of 17 pF, a threshold voltage of 2516 V and a temperature of 210° C. Alternatively, when the EEFL 12 has a diameter of 3.0 mm, the external electrode 12b having a length of 15 mm and the glass 12a having a thickness of 0.3 mm, pinholes are generated at an electrode capacitance of 20 pF, a threshold voltage of 2480 V and a temperature of 240° C. Alternatively, when the EEFL 12 has a diameter of 3.0 mm, the external electrode 12b having a length of 15 mm and the glass 12a having a thickness of 0.5 mm, pinholes are generated at an electrode capacitance of 11 pF, a threshold voltage of 3520 V and a temperature of 130° C.

Although other factors such as a tube current or a tube voltage may affect the generation of pinholes, the temperature of the external electrode 12b is the most critical factor to the generation of the pinholes. For example, when a plurality of lamps is connected in parallel, a state of each lamp is determined with the temperature of an external electrode because the temperature depends on the state of the lamp.

Figure 3:
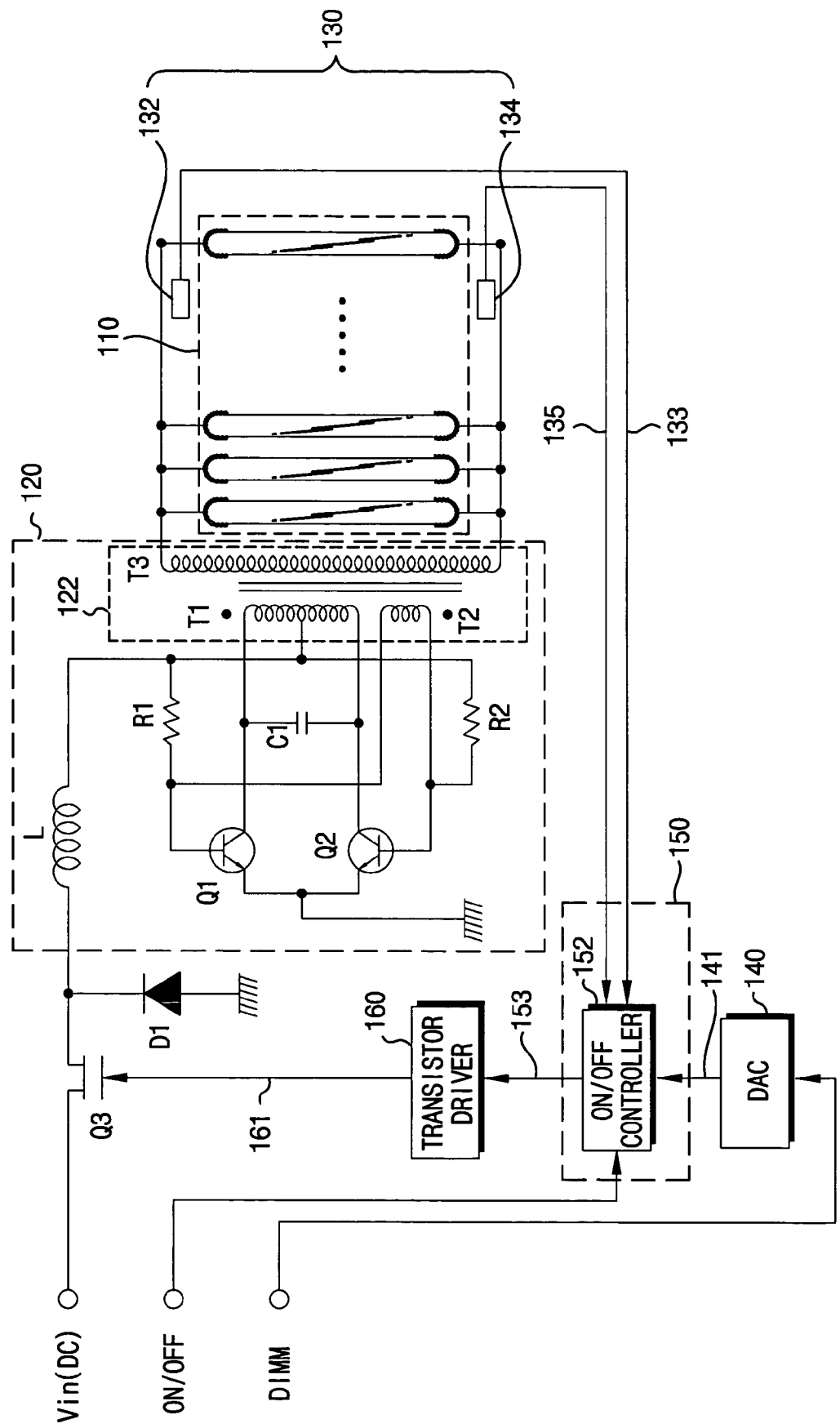
FIG. 3 is a schematic view illustrating a device to control operation of lamps according to an exemplary embodiment of the present invention.

FIG. 3 is a schematic view illustrating a device to control operation of lamps according to an exemplary embodiment of the present invention. The device includes a switching part, a power outputting part 120, a temperature sensing part 130 and a controlling part 150, and feedback controls the temperatures of a lamp array 110 by comparing the temperatures with a threshold temperature. FIG. 3 shows a floating type device.

The switching part includes a power transistor Q3 having a source to receive a direct current from an outside, a gate to receive a first switching signal 153 from the controlling part 150, and a drain to output the received direct current to the power outputting part 120. The transistor Q3 is activated in response to the first switching signal 153, and outputs the direct current to the power outputting part 120. For example, the direct current output from the power transistor Q3 may include a pulse current between 0 volt and the source voltage of the power transistor Q3.

The device includes a diode D1 between the power transistor Q3 and the power outputting part 120. The diode D1 includes a cathode connected to the drain of the power transistor Q3 and an anode connected to a ground, and prevents the flow of a reverse current from the power outputting part 120 to the power transistor Q3.

The power outputting part 120 is electrically connected between the drain of the power transistor Q3 and the lamp array 110. The power outputting part 120 converts the direct current output from the power transistor Q3 into an alternative current, and provides the lamp array 10 with the alternative current. As an exemplary, the power outputting part 120 may be a resonance type royer inverter. The power outputting part 120 includes an inductor L, a transformer 122, a resonance capacitor C1, first and second resistors R1 and R2, first and second transistors Q1 and Q2.

The inductor L is connected to the drain of the power transistor Q3. The inductor L removes impulse components of the direct current output from the power transistor Q3 and provides the first resistor R1 with the current. Further, the inductor L reserves electrical energy in itself and induces a reverse current to flow the diode D1 during the inactivation of the power transistor Q3.

The transformer 122 includes a primary coil having first and second sub-coils T1 and T2 and a secondary coil having a third sub-coil T3. The first sub-coil T1 receives the alternative current from the inductor L via a middle tap, and the received alternative current passes through the first and third sub-coils T1 and T3. The alternative current passing though the first and third sub-coils T1 and T3 is induced as a high alternative voltage via an electromagnetic induction, which is applied to the lamp array 110. The second sub-coil T2 selectively activates the first or second transistor Q1 or Q2 in response to the alternative current applied to the first sub-coil T1.

The resonance capacitor C1 is installed in parallel with the first sub-coil T1 to thereby form an LC resonance circuit with the inductance component of the first sub-coil T1.

The first and second transistors Q1 and Q2 are selectively activated by the second sub-coil T2, and operate together the transformer 122. The first transistor Q1 includes a base serially connected to the first resistor R1, a collector connected to one end of the resonance capacitor C1, and a grounded emitter. The second transistor Q2 includes a base connected to the second resistor R2, a collector connected to the other end of the resonance capacitor C1, and an emitter commonly grounded with the emitter of the first transistor Q1. Further, the first sub-coil T1 is connected in parallel to the collectors of the first and second transistors Q1 and Q2, and is connected to the resonance capacitor C1 in parallel. The both ends of the second sub-coil T2 are connected to the bases of the first and second transistors Q1 and Q2, respectively. Therefore, the voltage of the second sub-coil T2 is applied to the bases of the first and second transistors Q1 and Q2.

The direct current output from the power transistor Q3, for example, a pulse current, is received to the base of the first transistor Q1 through the resistor R1, and is received to the middle tap of the first sub-coil T1 after passing through the inductor L in series. The inductor L includes, for example, a choke coil, which transforms the current supplied into the inverter 120 into a steady current. The steady current, passing through the inductor L and the first sub-coil T1, is induced to have a high steady voltage at the third sub-coil T3. In order to that, the number of turns of the third sub-coil T3 is greater than the number of turns of the first sub-coil T1. The steady voltage is applied to each of the lamp array 110, which is connected in parallel to the third sub-coil T3.

The high steady voltage may have the same straight polarity and reverse polarity to a high alternative current, or may have the same maximum level and minimum level to the high alternative current. Further, the steady voltage may have a first alternative current applied to first ends of the lamps of the lamp array 110, and a second alternative current, which has a 180 degree phase difference from the first alternative current, applied to second ends of the lamps of the lamp array 110.

The temperature sensing part 130 includes first and second temperature detectors 132 and 134 adjacently disposed at both ends of each lamp of the lamp array 110. The temperature sensing part 130 detects the operation temperatures of the lamps, and provides the detected temperatures to the controlling part 150. For example, the first temperature detector 132 is disposed adjacent to a first end of each lamp of the lamp array 110. The first temperature detector 132 detects first temperatures of the lamp array 110 at the operation of the lamp array 110, and outputs a first temperature signal 133 to the controlling part 150. The second temperature detector 134 is disposed adjacent to a second end of each lamp of the lamp array 110, and detects second temperatures of the lamp array 110 at the operation of the lamp array 110. In response to the detection of the second temperature, the second temperature detector 134 outputs a second temperature signal 135 to the controlling part 150.

As an exemplary embodiment, the first or second temperature detector 132 or 134 includes a thermister. Further, the temperature sensing part 130 may include a plurality of temperature detectors, each being disposed at either end of each lamp of the lamp array 110. When a plurality of temperature detectors is used for the temperature sensing part 130, the average value of the temperatures detected form the plurality of the temperature detectors is supplied to the controlling part 150. Furthermore, the temperature detector 132 or 134 may be disposed such that the temperature detector 132 or 134 makes contact with the either end of each lamp of the lamp array 110.

The controlling part 150 includes an on-off controller 152. The controlling part 150 is activated/inactivated in response to an external on/off signal, and provides the power transistor Q3 with the first switching signal 153 in response to an analogue dual in-line module (DIMM) signal 141 from a digital-to-analogue converter (DAC) 140 and the first and second temperature signals 133 and 135. The controlling part 150 outputs the first switching signal 153 by controlling the pulse width of the first switching signal 153 such as a pulse width modulator, and feedback controls the temperatures of the lamps.

For example, the controlling part 150 compares a threshold temperature with the first or second temperature signal 133 or 135 and outputs the first switching signal 153 according to the compared result. On the threshold temperature, pinholes are generated on the external electrode of the lamps of the lamp array 110. Particularly, when the temperature signal 133 or 135 indicates that the lamp temperatures during the lamp operation are lower than but close to the threshold temperature, the controlling part 150 controls and outputs the first switching signal 153 to reduce the tube voltage or tube current of the lamps of the lamp array 110. Otherwise, when the temperature signal 133 or 135 indicates that the temperatures of the lamps during the operation of the lamps are higher than the threshold temperature, the controlling part 150 controls and outputs the first switching signal 153 to turn off the lamps of the lamp array 110. The controlling part 150 may further include an oscillator (not shown) for creating an oscillating signal.

The device further includes the DAC 140 and a transistor driver 160. The DAC receives from an outside the DIMM signal, which is a digital signal having a predetermined duty value, and is inputted from an operator to control lamp brightness. The DAC 140 converts the digital DIMM signal into an analogue DIMM, and transmits it to the controlling part 150. The transistor driver 160 amplifies the first switching signal 153, having a low level, output from the controlling part 150, and provides the amplified switching signal 161 to the power transistor Q3.

The lamp array 130 includes a plurality of EEFLs connected to each other in parallel. Although FIG. 3 shows the EEFL having external electrodes at both ends thereof, the lamp array 110 may include a plurality of external-internal electrode fluorescent lamps (EIFLs) or any other configuration, such as a mixture of the EEFLs and the EIFLs. When the lamp array 110 includes a plurality of the EIFLs, the external electrodes of EIFLs may be only connected to each other at one ends of the lamps, the internal electrodes of EIFLs may be only connected to each other at the other ends of the lamps, or the external and internal electrodes may be crossly connected to each other to thereby form the parallel-connected EIFLs. Further, a ballast capacitor may be formed at either end or both ends of each lamp. Furthermore, the lamp array 110 may include a plurality of fluorescent lamps, for example, CCFL, in which internal electrodes are disposed at the both inner ends of the lamp tube, and the lamp tube is easily fractured in response to a high voltage.

Thus, the device to control the operation of the lamps detects the temperature of the external electrode of a lamp, for example, EEFL, which affects the generation of pinholes, by using the temperature detectors disposed on the external electrode of the lamp, and controls the operation of the lamp based on the comparison result of the detected temperatures with a threshold temperature. When the detected temperature of the external electrode is lower than but close to the threshold temperature, the tube voltage or current is controlled to be reduced. When the detected temperature of the external electrode is higher than the threshold temperature, the lamp is automatically shutdown.

Figure 4:
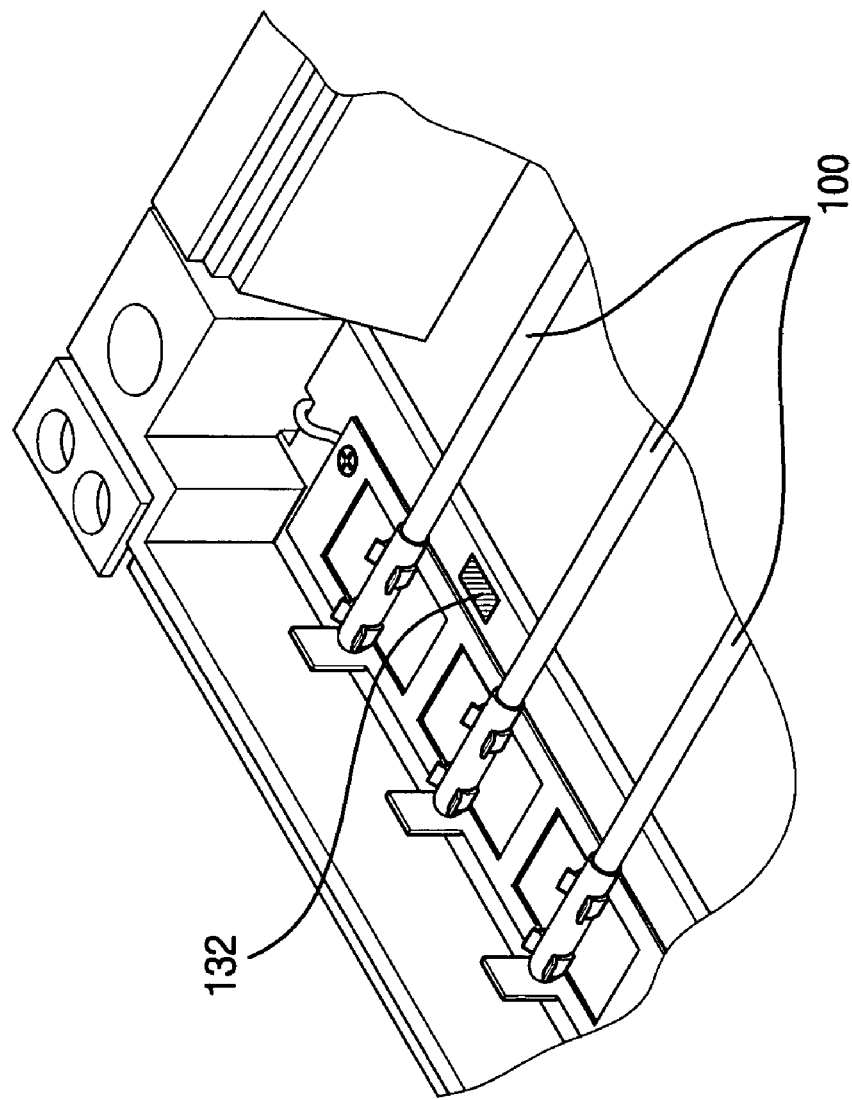
FIG. 4 is a perspective view illustrating a temperature detector installed on a backlight assembly according to an exemplary embodiment of the present invention.

FIG. 4 is a perspective view illustrating a temperature detector installed to the backlight assembly. The temperature detector 132 is positioned adjacent to the external electrodes of a plurality of lamps 100, and detects the temperatures of the external electrodes of the lamps 100 during the lamp operation. As described above, the temperature detector 132 may be disposed adjacent to one of the external electrodes of the lamps 100, or a plurality of temperature detectors may also be disposed adjacent to each external electrode of the lamps 100, respectively.

Figure 5:
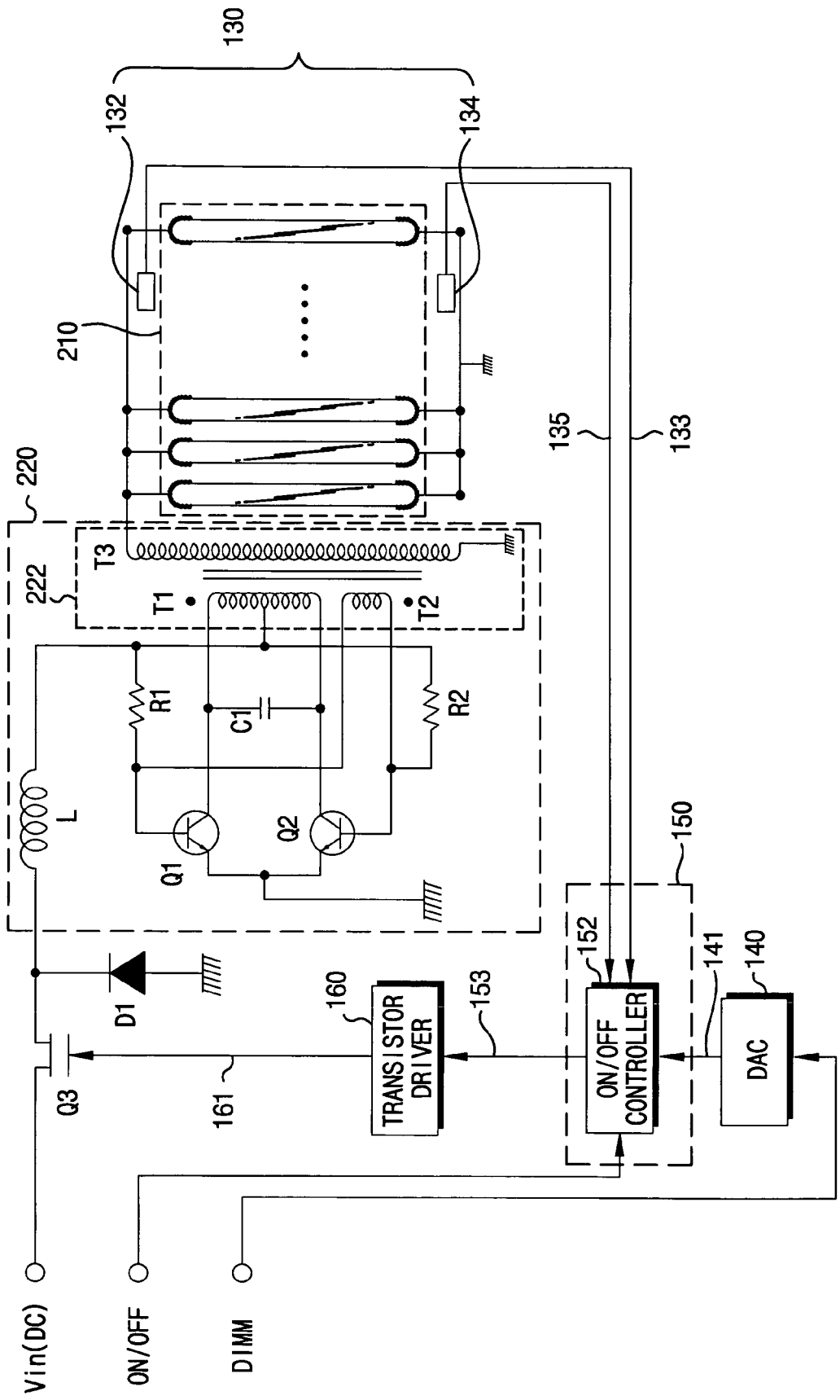
FIG. 5 is a schematic view illustrating a device to control operation of lamps according to another exemplary embodiment of the present invention.

FIG. 5 is a schematic view illustrating a device to control operation of lamps according to another exemplary embodiment of the present invention. FIG. 5 illustrates a grounding type operating device. In FIG. 5, the same reference numerals denote the same elements in FIG. 3, and thus the detailed descriptions of the same elements will be omitted.

The device includes a switching part having a power transistor Q3, a diode D1, a power outputting part 220, a temperature sensing part 130, a DAC 140, a controlling part 150, and a transistor driver 160. The device converts a direct current supplied from an outside into an alternative current, and provides the alternative current to a lamp array 210 having a plurality of lamps connected with each other in parallel. In the device of FIG. 5, a transformer 222 of the power outputting part 220 includes a third sub-coil T3 having one end connected to a ground. The other end of the third sub-coil T3 is commonly connected to the hot electrodes of the lamps of the lamp array 210, so that high alternative voltage raised by the transformer 222 is applied to each lamp. The cold electrodes of the lamps of the lamp array 210 are commonly connected to the ground.

Figure 6:
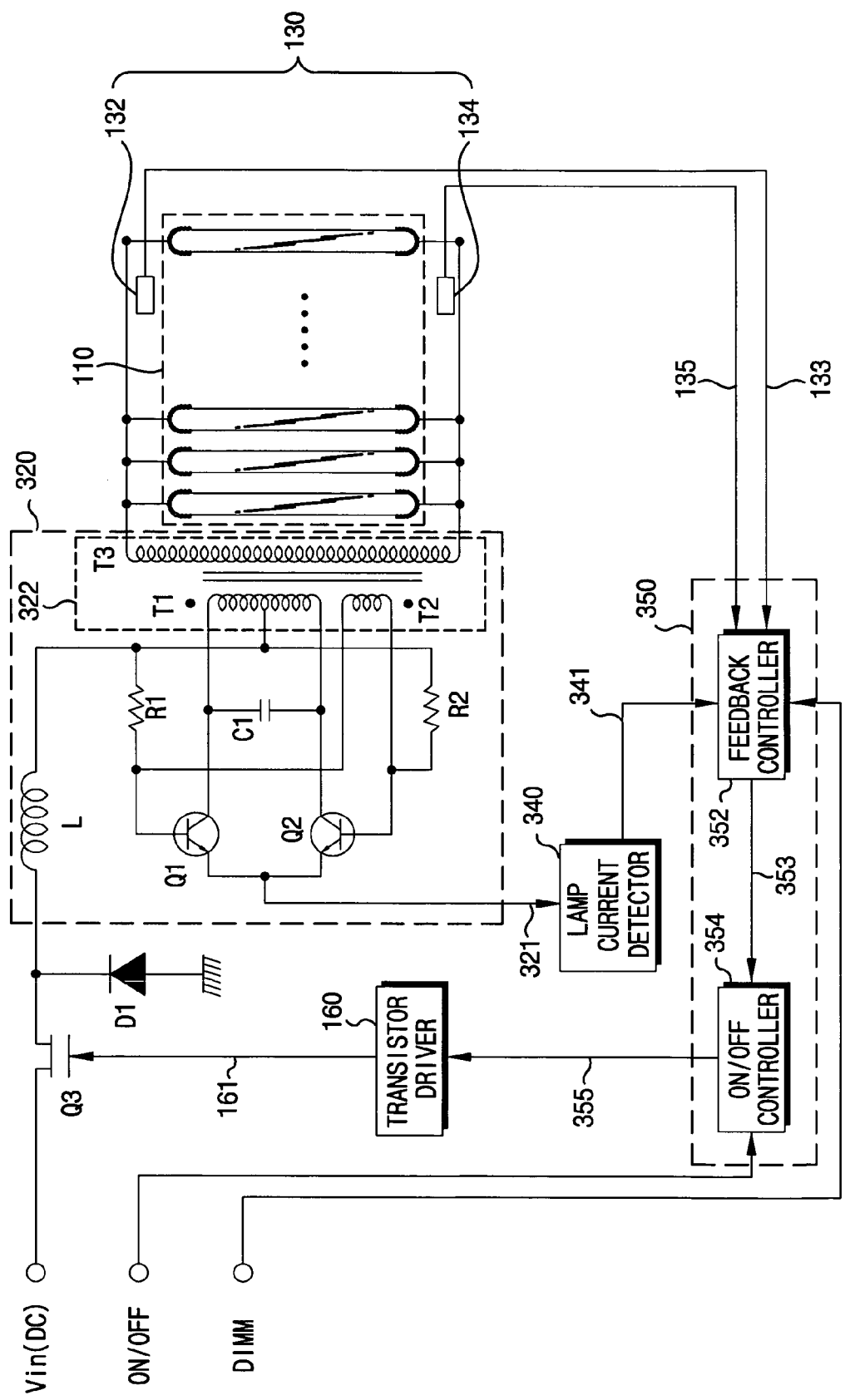
FIG. 6 is a schematic view illustrating a device to control operation of lamps according to another exemplary embodiment of the present invention.

FIG. 6 is a schematic view illustrating a device to control operation of lamps of a backlight assembly according to another exemplary embodiment of the present invention. FIG. 6 illustrates a floating type operating device in which currents of lamps are detected from an input portion of a power outputting part 320. In FIG. 6, the same reference numerals denote the same elements in FIGS. 3 and 5, and thus the detailed descriptions of the same elements will be omitted.

The device includes a switching part having a power transistor Q3, a diode D1, a power outputting part 320, a temperature sensing part 130, a lamp current detector 340, a controlling part 350, and a transistor driver 160. The device converts a direct current received from an outside into an alternative current, and provides the alternative current to a lamp array 110 having a plurality of lamps connected with each other in parallel.

The power outputting part 320 includes an inductor L, a transformer 322, a resonance capacitor C1, first and second resistors R1 and R2, first and second transistors Q1 and Q2. As an exemplary, the inverter 320 may be a resonance type royer inverter.

The inductor L converts a direct current received from the power transistor Q3. The first transistor Q1 includes a base connected to the first resistor R1 through which the alternative current passes, a collector connected to one end of the resonance capacitor C1, and an emitter connected to a ground. The second transistor Q2 includes a base connected to a second resistor R2 through which the alternative current passes and a collector connected to the other end of the resonance capacitor C1, an emitter connected to the ground. The first and second transistors Q1 and Q2 operate together the transformer 122.

The lamp current detector 340 is connected between the first and second transistors Q1 and Q2, and converts an alternative signal 321 supplied from the emitters of the first and second transistors Q1 and Q2 into a direct signal. The direct signal 341 is transmitted to the controlling part 350.

The controlling part 350 includes a feedback controller 352 and an on-off controller 354. In response to the direct signal from the lamp current detector 340 and the first and second temperature signals 133 and 135 from the temperature sensing part 130, the feedback controller 352 outputs a second switching signal 353 to the on/off controller 354. The on/off controller 354 outputs a first switching signal 355 to the transistor driver 160, in response to a DIMM signal from an outside and the first switching signal 353 output from the feedback controller 352. The first switching signal 355 is amplified by the transistor driver 160 and is provided to a gate of the power transistor Q3. Thus, the first switching signal 355 controls the level of the alternative voltage applied to each lamp of the lamp array 110 in response to the first and second temperature signals 133 and 135. The controlling part 350 may have an integrated circuit (IC), and operate as a feedback control type for regulation of the output voltage.

Figure 7:
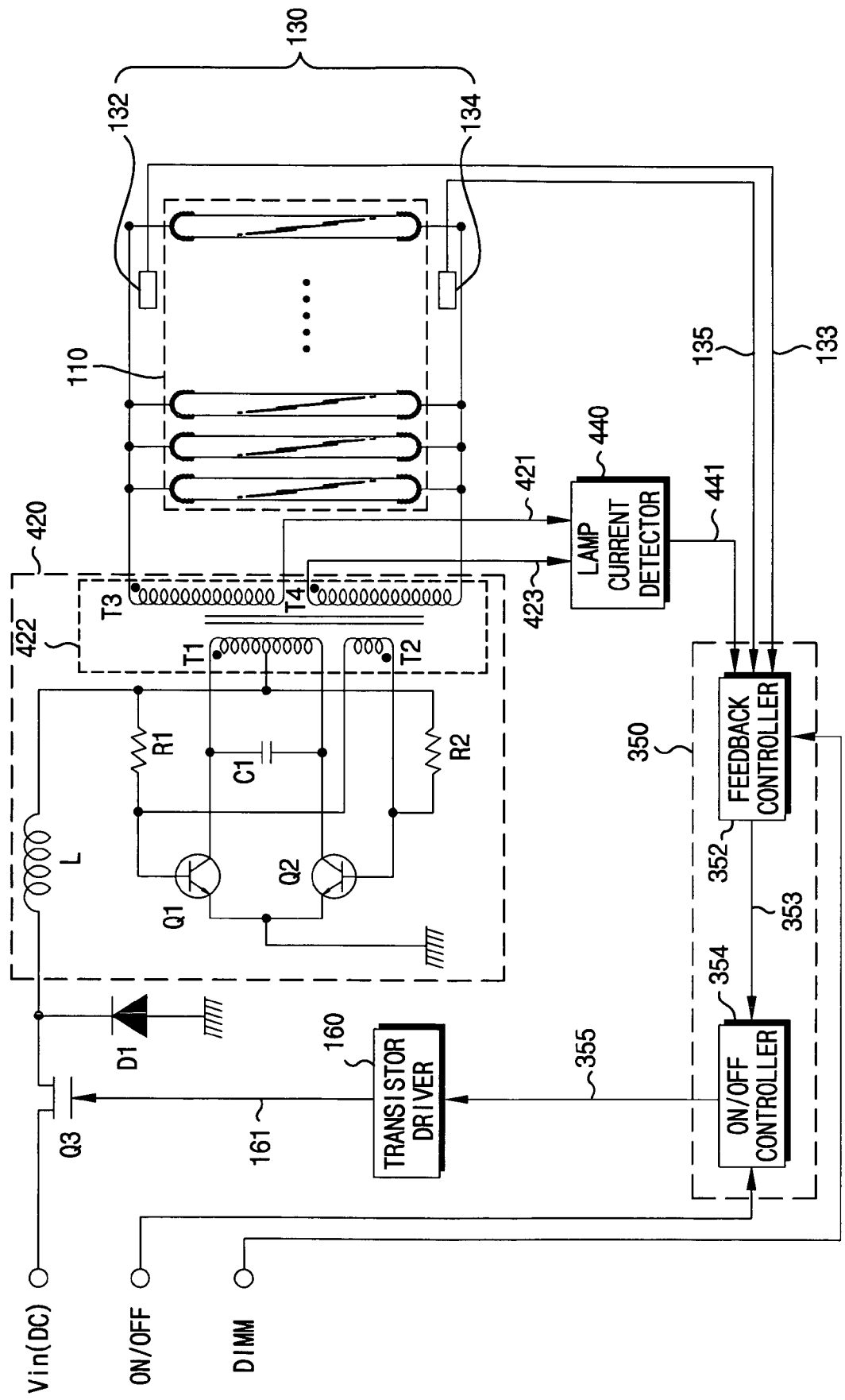
FIG. 7 is a schematic view illustrating a device to control operation of lamps according to another exemplary embodiment of the present invention.

FIG. 7 is a schematic view illustrating a device to control operation of lamps according to another exemplary embodiment of the present invention. FIG. 7 illustrates a floating type operating device in which currents of lamps are detected from an output portion of a power outputting part 420. In FIG. 7, the same reference numerals denote the same elements in FIGS. 3, 5 and 6, and thus the detailed descriptions of the same elements will be omitted.

The device includes a switching part having a power transistor Q3, a diode D1, a power outputting part 420, a temperature sensing part 130, a lamp current detector 440, a controlling part 350, and a transistor driver 160. The device converts a direct cur-rent supplied from an outside into an alternative current, and provides the alternative current to a lamp array 110 having a plurality of lamps connected with each other in parallel.

The power outputting part 420 includes an inductor L, a transformer 422, a resonance capacitor C1, first and second resistors R1 and R2, first and second transistors Q1 and Q2. As an exemplary, the inverter 420 may be a resonance type royer inverter.

The transformer 422 includes a primary coil having first and second sub-coils T1 and T2 at an input and a secondary coil having third and fourth sub-coils T3 and T4 at an output. The alternative current output from the inductor L is applied to the first sub-coil T1 via a middle tap, and the current applied to the first sub-coil T1 is transmitted to the third and fourth sub-coils T3 and T4 by electromagnetic induction. The second sub-coil T2 selectively activates the first or second transistor Q1 or Q2 in response to the alternative current applied to the first sub-coil.

The alternative voltage applied to the first sub-coil T1 is induced to be a high alternative voltage on the third and fourth sub-coils T3 and T4, which is applied to the lamp array 110. The third and fourth sub-coils T3 and T4 are wound in the same direction, and thus the third and fourth sub-coils T3 and T4 are regarded as parallel-connected coils. The alternative currents 421 and 423 of the third and fourth sub-coils T3 and T4 are detected by the lamp current detector 440. The lamp current detector 440 converts the alternative currents 421 and 423 into a direct current 441, which is provided to the controlling part 350.

Figure 8:
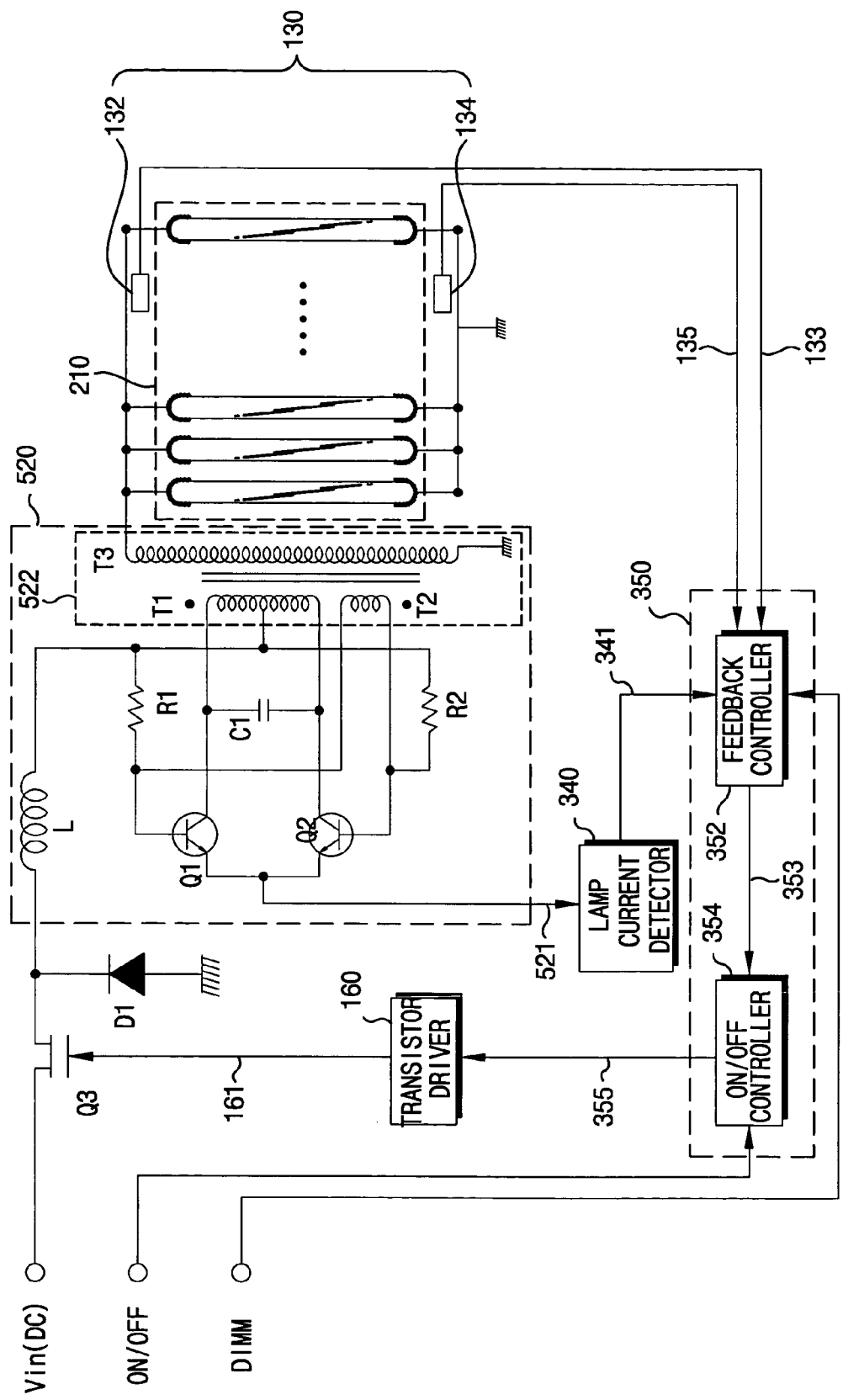
FIG. 8 is a schematic view illustrating a device to control operation of lamps according to another exemplary embodiment of the present invention.

FIG. 8 is a schematic view illustrating a device to control operation of lamps according to another exemplary embodiment of the present invention. FIG. 8 illustrates a grounding type operating device in which currents of lamps are detected from an input portion of a power outputting part 520. In FIG. 8, the same reference numerals denote the same elements in FIGS. 3, and 5 to 7, and thus the detailed descriptions of the same elements will be omitted.

The device includes a switching part having a power transistor Q3, a diode D1, a power outputting part 520, a temperature sensing part 130, a lamp current detector 340, a controlling part 350, and a transistor driver 160. The device converts a direct current supplied from an outside into an alternative current, and provides the alternative current to a lamp array 210 having a plurality of lamps connected with each other in parallel. The power outputting part 520 includes an inductor L, a transformer 522, a resonance capacitor C1, first and second resistors R1 and R2, first and second transistors Q1 and Q2. As an exemplary, the power outputting 520 may be a resonance type royer inverter. In FIG. 8, the third sub-coil T3 of the transformer 522 is connected to a ground, and the alternative currents 521 at an input portion of the power outputting part 520 is detected by a lamp current detector 340.

Figure 9:
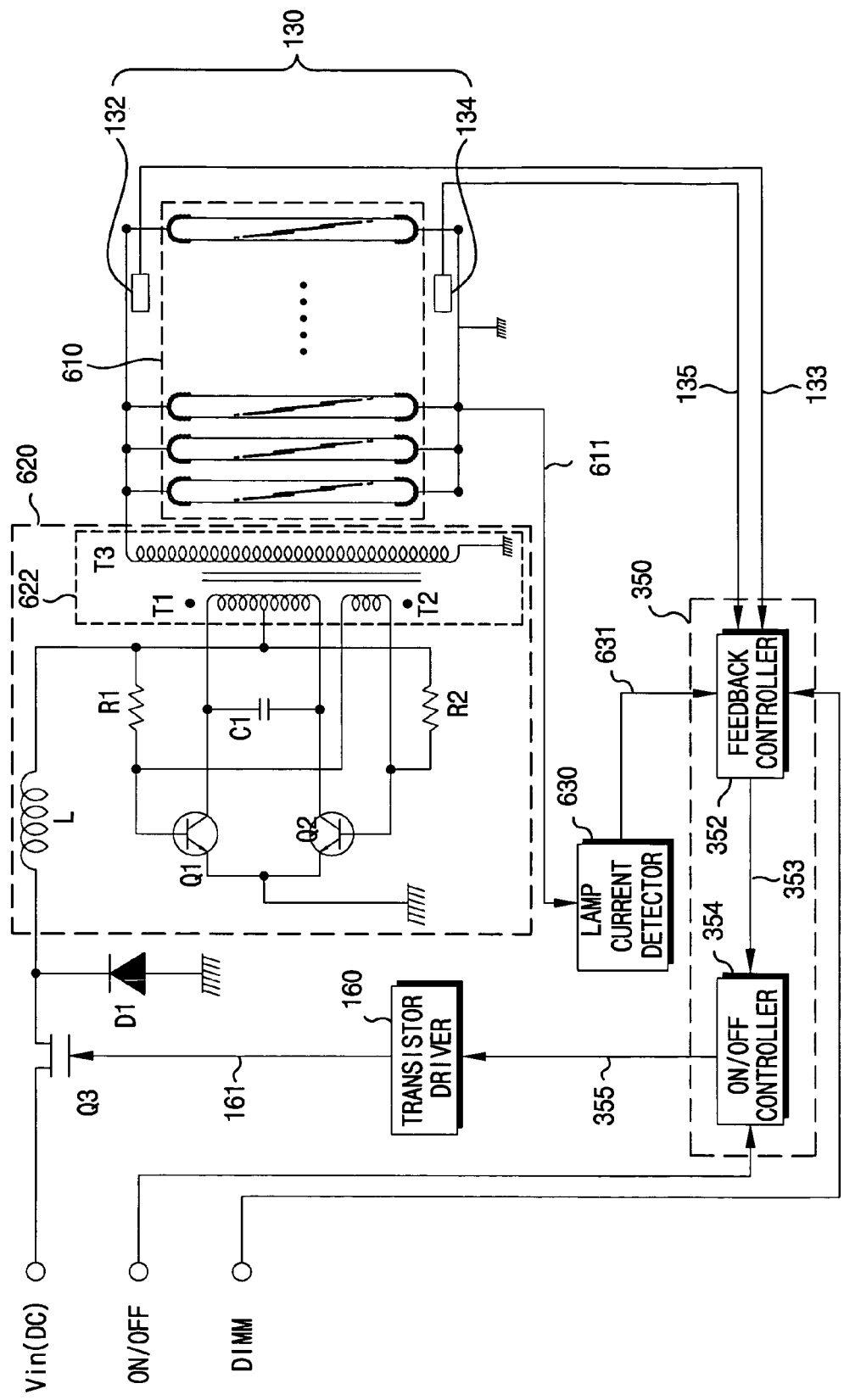
FIG. 9 is a schematic view illustrating a device to control operation of lamps according to further exemplary embodiment of the present invention.

FIG. 9 is a schematic view illustrating a device to control operation of lamps according to further exemplary embodiment of the present invention. FIG. 9 illustrates a grounding type operating device in which currents of lamps are detected from a ground portion of a power outputting part 620. In FIG. 9, the same reference numerals denote the same elements in FIGS. 3 and 5 to 8, and thus the detailed descriptions of the same elements will be omitted.

The device includes a switching part having a power transistor Q3, a diode D1, a power outputting part 620, a temperature sensing part 130, a lamp current detector 630, a controlling part 350, and a transistor driver 160. The device converts a direct current supplied from an outside into an alternative current, and provides the alternative current to a lamp array 610 having a plurality of lamps connected with each other in parallel.

The power outputting part 620 includes an inductor L, a transformer 622, a resonance capacitor C1, first and second resistors R1 and R2, first and second transistors Q1 and Q2. The first ends of the lamps of the lamp array 610, for example, hot electrodes, are commonly connected to a third sub-coil T3 of the transformer 622. Thus, a high alternative voltage boosted by the transformer 622 is applied to each lamp of the lamp array 610. Further, the second ends of the lamps, for example, cold electrodes, are commonly connected to a ground and the lamp current detector 630. The lamp current detector 630 detects a total amount of the currents 611 passing the lamp array 610, and converts the currents 631 into a direct current 631, which is transmitted to the controlling part 350.

Figure 10:
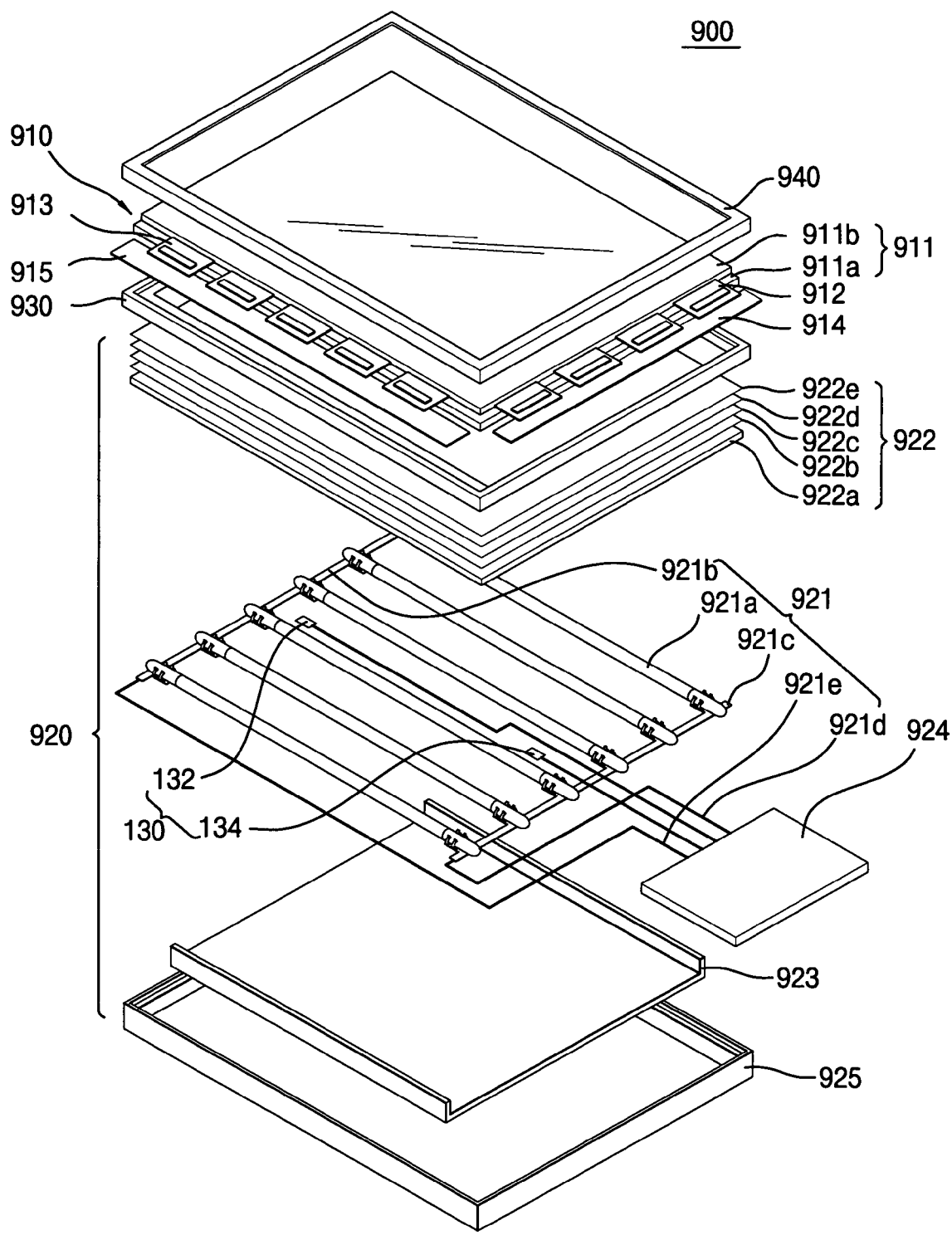
FIG. 10 is an exploded perspective view schematically showing a liquid crystal display device according to an exemplary embodiment of the present invention.

The devices to control operations of lamps, according to the above exemplary embodiment may be installed to a direct type backlight assembly. The direct type backlight assembly is installed into a liquid crystal display device, as shown in FIG. 10. FIG. 10 is an exploded perspective view schematically showing a liquid crystal display device according to the present invention.

Referring to FIG. 10, a direct type LCD device 900 according to the present invention includes an LC panel assembly 910 to display an image, and a direct type backlight assembly 920 to provide a light to the LC panel assembly 910.

The LC panel assembly 910 includes an LC panel 911 having a thin film transistor (TFT) substrate 911a, a color filter substrate 911b and a liquid crystal layer (not shown) interposed between the TFT substrate 911a and the color filter substrate 911b. Further, the LC panel assembly 910 includes a data printed circuit board (PCB) 915, a gate PCB 914, a data tape carrier package (TCP) 913, and a gate TCP 912.

The direct type backlight assembly 920 includes a lamp unit 921 to generate a first light, a reflector 923 to reflect the first light emitted from the lamp unit 921, a light regulator 922 to diffuse the first light to thereby generate a second light having a uniform distribution of luminance, a device 924 to control an operation of lamps, and a bottom chassis 925 to receive the lamp unit 921, the light regulator 922, the reflector 923 and the device 924. The light regulator 922 includes a diffusing plate 922a and sheets to maintain uniform brightness emitted from the lamps. The sheets may be chosen depending on a kind of the LCD devices. For example, the light regulator 922 may include a plurality of diffusing sheets 922b sequentially stacked on the diffusing plate 922a, a lower prism sheet 922c, an upper prism sheet 922d, and a protecting sheet 922e. Although not shown in FIG. 10, the device 900 may include a mold frame disposed between the lamp unit 921 and the diffusing plate 922a in order to support the diffusing plate 922a and the sheets and maintain a predetermined space between lamps of the lamp unit 921.

The lamp unit 921 includes a plurality of lamps 921a, a plurality of first and second lamp clips 921b and 921c coupled to both ends of each lamp, respectively, a plurality of first and second power lines 921d and 921e to supply an electrical power to the first and second lamp clips 921b and 921c, respectively. Both the first and second power lines 921d and 921e are connected to the device 924 to generate the first and second electrical powers.

The device 924 provides the first and second electrical powers to the plurality of lamps 921a connected with each other in parallel. In addition, the device 924 controls the first and second electrical powers in accordance with the temperature detected by a temperature sensing part 130. The temperature sensing part 130 includes first and second temperature detectors 132 and 134 disposed adjacent to the lamps 921a. Although FIG. 10 shows the temperature detectors 132 and 134 disposed adjacent to the both ends of a lamp 921a, the temperature detectors 132 and 134 may be directly disposed on the both ends of the lamp 921a or one temperature detector may be directly disposed on one end of the lamp 921a.

The bottom chassis 925 is formed into a hexahedral box of which an upper face is removed, and has a predetermined receiving space therein. The reflector 923 is disposed along inner surfaces of the receiving space, and the lamp unit 921 is disposed above the reflector 923 in parallel therewith. The light regulator 922 is disposed above the lamp unit 921 spaced apart by a predetermined distance.

The LCD device 900 further includes a middle chassis 930 disposed above the light regulator 922, on which the LC panel 911 is disposed, and a top chassis 940 disposed above the LC panel 911. The top chassis 940 is coupled with the bottom chassis 925 to thereby complete the direct type LCD device 900.

According to the present invention, a device to control operation of lamps includes a plurality of temperature detectors disposed adjacent to the lamps connected with each other in parallel, and determines the temperatures of the lamps. When the detected lamp temperatures are lower than or close to the threshold temperature on which pinholes are generated, the device controls a level of a lamp tube voltage or current to prevent from the generation of the pinholes. When the lamp temperatures are higher than the threshold temperature, an electrical power is automatically cut off to turn off the lamps, thereby preventing from the lamp damages.

For example, when the temperature detectors are disposed on each lamp of a plurality of the lamps, each lamp is controlled to have its temperature lower than the threshold temperature. Alternatively, the temperature detectors may be disposed on a metal lamp clip connected to the electrodes of lamps, which are connected with each other in parallel, when each lamp's lamp temperature is not easily detected. Because the temperature of the metal lamp clip is regarded as an average temperature of the external electrodes of the lamp, the temperature of the metal lamp clip is compared with the threshold temperature to control the temperatures of the lamps. Thus, when the metal clip temperature is higher than the threshold temperature, an electrical power for the lamps is cut off or reduced before the pinholes are generated.

Accordingly, a device to control operation of lamps according to the present invention prevents from the pinhole generation and effectively operates lamps. Further, other various problems accompanying the pinhole such as a mercury leakage and a current deflection are also prevented. Furthermore, the device is advantageously utilized regardless of the number of lamps, lamp pitch between adjacent lamps or restrictions.

Having described the exemplary embodiments of the present invention and its advantages, it is noted that various changes, substitutions and alterations can be made herein without departing from the spirit and scope of the invention as defined by appended claims.

What is claimed is:

1. A device for controlling operation of lamps, comprising:
    a power outputting part to provide a power voltage to a lamp array having at least one lamp;
    a temperature sensing part to detect a temperature of the lamp and to generate a temperature signal; and
    a controlling part to compare the temperature of the lamp with a threshold temperature at which pinholes are generated to generate a first switching signal, in response to the temperature signal, and to output the first switching signal to the power outputting part to feedback control the temperature of the lamp.

2. The device of claim 1, wherein the controlling part generates the first switching signal to reduce the power voltage of the power outputting part, when the temperature of the lamp is within the threshold temperature.

3. The device of claim 1, wherein the controlling part generates the first switching signal to cut off the power voltage of the power outputting part, when the temperature of the lamp is higher than the threshold temperature.

4. The device of claim 1, further comprising a switching part to receive a direct current from an outside and to provide the direct current with the power outputting part, in response to the first switching signal from the controlling part.

5. The device of claim 4, wherein the switching part includes a transistor.

6. The device of claim 4, wherein the power outputting part includes:
    an inductor to receive the direct current from the switching part and to convert the direct current into an alternative current;
    an input portion to receive the alternative current, the input portion including first and second transistors being selectively activated and operating together the power outputting part; and
    an output portion to generate the power voltage in response to the alternative current from the inductor and provide the power voltage to either end or both ends of the lamp.

7. The device of claim 6, wherein the output portion includes first to third coils, wherein the first coil receives the alternative current from the inductor, the second coil selectively activates the first and second transistors in response to the alternative current applied to the first coil, and the third coil induces the alternative current to have a high level and generates the power voltage with the high alternative current.

8. The device of claim 7, wherein the third coil has ends connected to both ends of the lamp to provide the power voltage to the lamp.

9. The device of claim 7, wherein the third coil has one end connected to either end of the lamp to provide the lamp with the power voltage, and the other end connected to a ground.

10. The device of claim 6, wherein the output portion includes first to fourth coils, wherein the first coil receives the alternative current from the inductor, the second coil selectively activates the first and second transistors in response to the alternative current applied to the first coil, and the third and fourth coils induce the alternative current to have a high level and generates the power voltage with the high alternative current, and wherein the third and fourth coils are connected to either end of the lamp, respectively.

11. The device of claim 6 wherein the power voltage has a first high alternative current applied to a first end of the lamp, and a second alternative current, which has a 180 degree phase difference from the first alternative current, applied to a second end of the lamp.

12. The device of claim 6, wherein the device further comprises a lamp current detector to detect the alternative current output from the input portion of the power outputting part, and
    wherein the controlling part includes:
        a feedback controller to generate a second switching signal, in response to the detected current output from the lamp current detector, the temperature signal from the temperature sensing part, and a dual in-line module (DIMM) signal from an outside; and
        an on/off controller to activate the controlling part in response to an on/off signal from the outside and to generate the first switching signal in response to the second switching signal output from the feedback controller.

13. The device of claim 6, wherein the device further comprises a lamp current detector to detect the alternative current output from the output portion of the power outputting part, and
    wherein the controlling part includes:
        a feedback controller to generate a second switching signal, in response to the detected current output from the lamp current detector, the temperature signal from the temperature sensing part, and a DIMM signal from an outside; and an on/off controller to activate the controlling part in response to an on/off signal from the outside and to generate the first switching signal in response to the second switching signal output from the feedback controller.

14. The device of claim 6, wherein the device further comprises a lamp current detector to detect current output from the lamp, and wherein the controlling part includes:

a feedback controller to generate a second switching signal, in response to the detected current output from the lamp current detector, the temperature signal from the temperature sensing part, and a DIMM signal from an outside; and an on/off controller to activate the controlling part in response to an on/off signal from the outside and to generate the first switching signal in response to the second switching signal output from the feedback controller.

15. The device of claim 6, wherein the lamp array includes a plurality of the lamps, and the device further comprises a lamp current detector to detect an average value of currents output from the lamps of the lamp array, and wherein the controlling part includes:

a feedback controller to generate a second switching signal, in response to the detected current output from the lamp current detector, the temperature signal from the temperature sensing part, and a DIMM signal from an outside; and an on/off controller to activate the controlling part in response to an on/off signal from the outside and to generate the first switching signal in response to the second switching signal output from the feedback controller.

16. The device of claim 4, further comprising a transistor driver to amplify the first switching signal output from the controlling part and to provide an amplified first switching signal to the switching part.

17. The device of claim 4, further comprising a diode connected between the switching part and the power outputting part to prevent a flow of a reverse current from the power outputting part to the switching part.

18. The device of claim 1, wherein the temperature sensing part includes at least one temperature detector adjacently disposed at either end or both ends of the lamp.

19. The device of claim 1, wherein the temperature sensing part includes at least one temperature detector making contact with either end or both ends of the lamp.

20. The device of claim 1, wherein the temperature sensing part includes at least one temperature detector disposed adjacent to the at least one lamp, and wherein the temperature sensing part generates the temperature signal indicating the temperature detected at the lamp.

21. The device of claim 1, wherein the temperature sensing part includes a thermister to detect the temperature of the lamp.

22. The device of claim 1, wherein the controlling part includes a pulse width modulator.

23. The device of claim 1, wherein the controlling part includes an on/off controller to activate the controlling part in response to an on/off signal from an outside.

24. The device of claim 1, further comprising a digital-to-analogue converter to convert a DIMM signal received from an outside into an analogue DIMM signal and to provide the controlling part with the analogue DIMM signal.

25. The device of claim 1, wherein the at least one lamp includes at least one of an external electrode fluorescent lamp (EEFL) and an external-internal electrode fluorescent lamp (EIFL); and wherein when the lamp array includes a plurality of the lamps, the lamps include a plurality of the EEFLs connected to each other in parallel, a plurality of the EIFLs connected to each other in parallel or a combination of the EEFLs and the EIFLs.

26. The device of claim 1, wherein the lamp array includes a plurality of the lamps, and the temperature sensing part includes a plurality of temperature detectors, each being disposed adjacent to each lamp of the lamp array; and wherein the temperature sensing part generates the temperature signal indicating an average value of the temperatures detected at the lamps.

27. A backlight assembly, comprising:

a lamp array to generate a first light, the lamp array including at least one lamp;

a device to control operation of the lamp, the device including:

a power outputting part to provide the lamp with a power voltage;

a temperature sensing part to detect a temperature of the lamp and to generate a temperature signal; and a controlling part to compare the temperature of the lamp with a threshold temperature at which pinholes are generated to generate a first switching signal, in response to the temperature signal, and to output the first switching signal to the power outputting part to feedback control the temperature of the lamp.

28. The backlight assembly of claim 27, wherein the at least one lamp includes at least one of an external electrode fluorescent lamp (EEFL) and an external-internal electrode fluorescent lamp (EIFL); and wherein, when the lamp array includes a plurality of the lamps, the lamps include the EEFLs connected to each other in parallel, a plurality of the EIFLs connected to each other in parallel or a combination of the EEFLs and the EIFLs.

29. The backlight assembly of claim 27, wherein the lamp array include at least one cold cathode fluorescent lamp.

30. The backlight assembly of claim 27, wherein the lamp includes a pair of metal clips coupled to both ends of the lamp.

31. The backlight assembly of claim 30, wherein the temperature sensing part includes at least one temperature detector adjacent disposed to either end of the lamp, and wherein the temperature detector detects a temperature of the metal cap coupled to either end of the lamp and generate the temperature signal.

32. The backlight assembly of claim 27, wherein the temperature sensing part includes at least one temperature detector disposed adjacent to either end of the lamp to detect the temperature of the lamp and to generate the temperature signal.

33. The backlight assembly of claim 27, wherein the temperature sensing part includes at least one temperature detector making contact with either end of the lamp to detect the temperature of the lamp and to generate the temperature signal.

34. The backlight assembly of claim 27, wherein the device further includes a switching part to receive a direct current from an outside and to provide the power outputting part with the direct current, in response to the first switching signal from the controlling part.

35. The backlight assembly of claim 34, wherein the device further includes a transistor driver to amplify the first switching signal output from the controlling part and to output the amplified first switching signal to the switching part.

36. The backlight assembly of claim 34, wherein the power outputting part converts the direct current from the switching part into an alternative current, induces the alternative current to have a high level, and generates the power voltage with the high alternative current.

37. The backlight assembly of claim 36, wherein the power voltage has a first high alternative current applied to a first end of the lamp, and a second alternative current, which has a 180 degree phase difference from the first alternative current, applied to a second end of the lamp.

38. The backlight assembly of claim 27, wherein the device further includes a DAC to convert a digital DIMM signal received from an outside into an analogue DIMM signal and to output the analogue DIMM signal to the controlling part.

39. The backlight assembly of claim 27, wherein the device further includes a lamp current detector to detect current of to the lamp; and
wherein the controlling part includes:
a feedback controller to generate a second switching signal, in response to the detected current output from the lamp current detector, the temperature signal from the temperature sensing part, and a DIMM signal from an outside; and
an on/off controller to activate the controlling part in response to an on/off signal from the outside and to generate the first switching signal in response to the second switching signal from the feedback controller.

40. The backlight assembly of claim 27, wherein the controlling part generates the first switching signal to reduce the power voltage of the power outputting part, when the temperature of the lamp is within the threshold temperature; and
wherein the controlling part generates the first switching signal to cut off the power voltage of the power outputting part, when the temperature of the lamp is higher than the threshold temperature.

41. The backlight assembly of claim 27, further comprising:
a reflector to reflect a first light emitted from the lamp array; and
a light regulator to diffuse the first light and to generate a second light having a uniform distribution.

42. The backlight assembly of claim 27, wherein the backlight assembly includes a direct type backlight assembly.

43. A liquid crystal display device, comprising:
a backlight assembly including a lamp array, having at least one lamp, to generate light; and
a liquid crystal panel, disposed on the backlight assembly, to display an image in response to the light output from the backlight assembly,
wherein the backlight assembly further includes a device to control operation of the lamp, the device includes:
a power outputting part to provide the lamp with a power voltage;
a temperature sensing part to detect a temperature of the lamp and to generate a temperature signal; and
a controlling part to compare the temperature of the lamp with a threshold temperature at which pinholes are generated to generate a first switching signal, in response to the temperature signal, and to output the switching signal to the power outputting part to feedback control the temperature of the lamp.

44. The liquid crystal display device of claim 43, wherein the lamp includes an external electrode at either end or both end of the lamp.

45. The liquid crystal display device of claim 43, wherein the lamp array includes a plurality of the lamps connected to each other in parallel.

46. The liquid crystal display device of claim 43, wherein the device further includes a switching part to receive a direct current from an outside and to provide the power outputting part with the direct current in response to the first switching signal.

47. The liquid crystal display device of claim 46, wherein the power outputting part converts the direct current output from the switching part into an alternative current, induces the alternative current to have a high level, and generate the power voltage with the high alternative current, and wherein the power voltage is applied to either end or both ends of the lamp.

48. The liquid crystal display device of claim 43, wherein the device further includes a lamp current detector to detect current of the lamp; and
wherein the power outputting part includes:
a feedback controller to generate a second switching signal, in response to the detected current output from the lamp current detector, the temperature signal output from the temperature sensing part, and a DIMM signal from an outside; and
an on/off controller to activate the controlling part in response to an on/off signal from the outside and to generate the first switching signal in response to the second switching signal output from the feedback controller.

49. A method for controlling operation of lamps, comprising:
supplying a power voltage to a lamp array having at least one lamp;
detecting a temperature of the lamp to generate a temperature signal;
generating a first switching signal by comparing the temperature of the lamp with a threshold temperature at which pinholes are generated; and
feedback controlling the temperature of the lamp in response to the first switching signal.

50. The method of claim 49, wherein supplying a power voltage includes:
supplying the power voltage to each end or both ends of the lamp.

51. The method of claim 50, wherein supplying a power voltage further includes:
supplying a direct current;
converting the direct current into an alternative current;
inducing the alternative current to have a high level; and
generating the power voltage with the high alternative current.

52. The method of claim 49, wherein the method further comprises detecting current of the lamp; and
wherein generating the first switching signal includes:
generating a second switching signal in response to the detected current of the lamp, the temperature signal, and a DIMM signal input from an outside; and
comparing the temperature of the lamp with the threshold temperature to generate the first switching signal, in response to the second switching signal and an on/off control signal input from the outside.

53. The method of claim 49, wherein generating the first switching signal includes:

comparing the temperature of the lamp with the threshold temperature to generate the first switching signal in response to a DIMM signal input from an outside and an on/off control signal input from the outside.

54. The method of claim 49, wherein feedback controlling the temperature of the lamp includes:

reducing the power voltage when the first switching signal indicates that the temperature of lamp is within the threshold temperature; and cutting off the power voltage when the first switching signal indicates that the temperature of the lamp is higher than the threshold temperature.

55. The method of claim 49, further comprising amplifying the first switching signal.

56. The method of claim 49, further comprising controlling the supplying of the power voltage in response to the first switching signal.

* * * * *